United States Patent [19]
Cassina

[11] Patent Number: 5,645,185
[45] Date of Patent: Jul. 8, 1997

[54] CRATE FOR PALLETS

[75] Inventor: Virginio Cassina, Bergamo, Italy

[73] Assignee: Futisplast S.p.A., Bergamo, Italy

[21] Appl. No.: 675,461

[22] Filed: Jun. 13, 1996

[30] Foreign Application Priority Data

Jul. 25, 1995 [EP] European Pat. Off. ............. 95830321

[51] Int. Cl.⁶ .................................................. B65D 19/00
[52] U.S. Cl. ........................................... 220/1.5; 220/485
[58] Field of Search .......................... 220/1.5, 485, 489, 220/410

[56] References Cited

U.S. PATENT DOCUMENTS

| | | | |
|---|---|---|---|
| 4,795,057 | 1/1989 | Jungels et al. | 220/1.5 X |
| 4,947,988 | 8/1990 | Schutz | 220/485 X |
| 5,060,815 | 10/1991 | Wendling et al. | 220/485 X |
| 5,110,000 | 5/1992 | Nichols | 220/1.5 X |
| 5,366,090 | 11/1994 | Schutz | 220/1.5 X |
| 5,467,884 | 11/1995 | Schutz | 220/1.5 |

FOREIGN PATENT DOCUMENTS 0370307  5/1990  European Pat. Off. ......... B65D 19/10

Primary Examiner—Steven M. Pollard
Attorney, Agent, or Firm—Sheridan Ross P.C.

[57] ABSTRACT

A crate for pallets, for example of the type containing a tank for liquids, is made automatically by so-called projection welding with minimum control of the welding parameters, from metal tubes arranged in a lattice structure with crossing points, the tubes including respective flat surfaces in mutually facing positions at the crossing points and extensive portions with flat bases facing each other at the crossing points, the bases being intended to adhere to each other when welding has been effected.

11 Claims, 3 Drawing Sheets

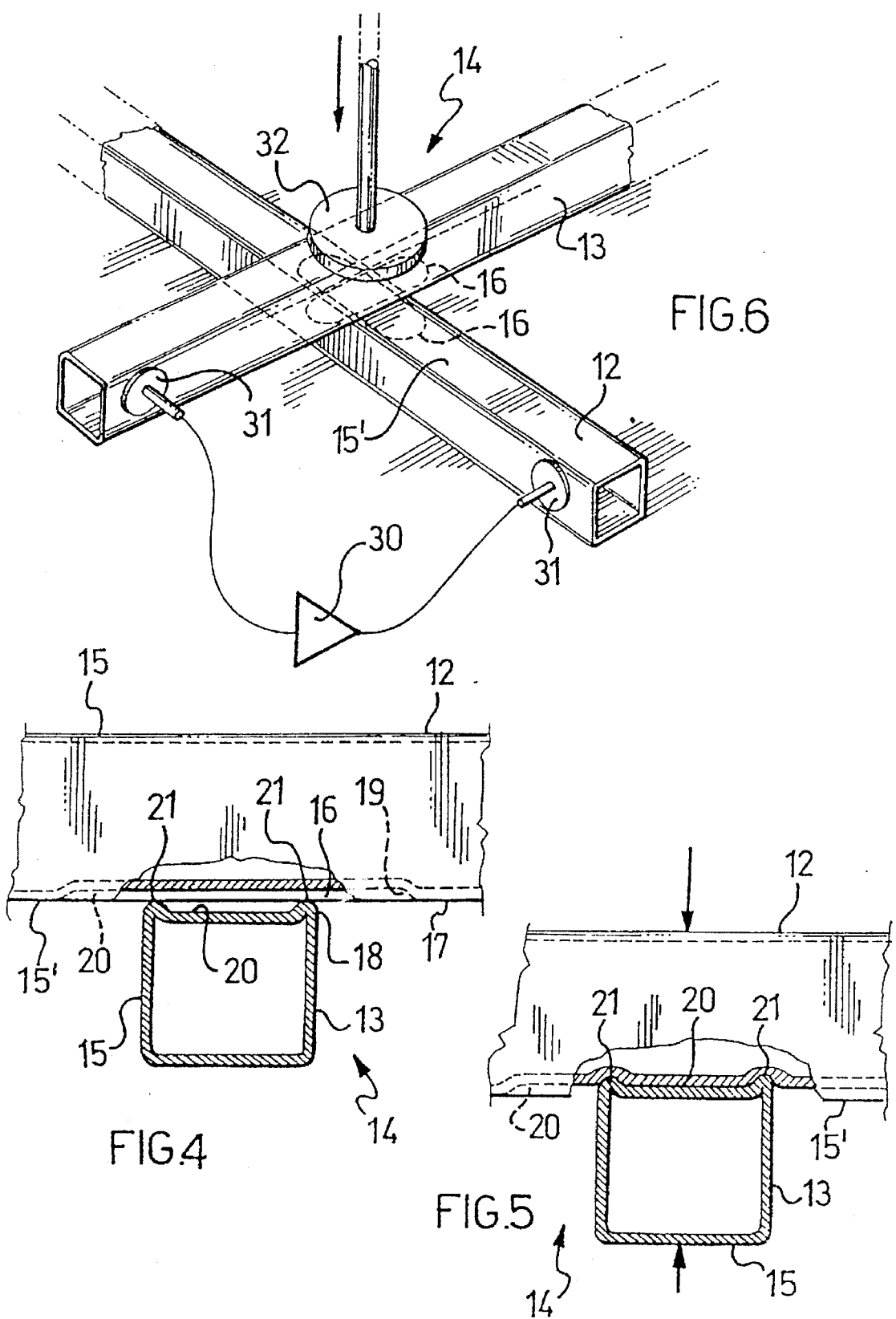

CRATE FOR PALLETS

BACKGROUND OF THE INVENTION

1. Field of the Invention

The present invention relates generally to a crate for pallets of the type comprising metal tubes arranged in a lattice structure.

More particularly it relates to a pallet crate in which the metal tubes are intended to be welded at crossing points of the lattice and have respective mutually-facing flat surfaces at the crossing points.

2. Description of the Prior Art

As is known, crates of the type specified are used on pallets to contain and protect material which is supported by the pallet itself.

The pallets, generally of wood but also of metal, are arranged so as to be lifted and transported easily by suitable forks of lift trucks and the like.

For example a typical use for pallet crates is for liquid containers, generally comprising a tank of plastics material.

The thin walls of the tank flex under the weight of the liquid in the tank and bear against the inside of the crate which thus prevents the tank itself from collapsing.

Furthermore it is possible to stack several pallets one on top of another by virtue of the presence of the crate since the weight of the pallets is supported structurally by the crates.

In order to manufacture the crates it is necessary to weld together a plurality of metal tubes, for example of circular or square section, at numerous crossing points. This operation, which is usually complicated and expensive, is carried out by welding with solder or by so-called projection welding.

European Patent Application No. 0,370,307 describes a pallet crate comprising circular section tubes which each have a curved recess made by pinching at the crossing points.

At each crossing point the recesses face each other so that the tubes may be welded by projection welding, that is, by the passage of an electric current through the four points of contact thus formed, at which the resistance to the passage of an electric current is particularly high.

The manufacture of crates described above, although allowing a certain degree of automation, requires accurate control of the welding parameters, that is the current strength, the application of a force to compress one element against another and the period of time for which the current is passed.

This control complicates the manufacture of the pallet crates and also results in a considerable waste of energy.

SUMMARY OF THE INVENTION

The technical problem at the root of the present invention consists of devising a crate for pallets which has structural characteristics such that its manufacture overcomes all the problems mentioned with reference to the prior art.

This problem is solved by a crate of the type specified which is characterised in that it has recesses formed in the flat surfaces each extending along the longitudinal axis of the respective metal tube and transverse the respective recess of the facing metal tube, the recesses including an extensive portion with a flat base, the flat bases of the recesses in mutually facing positions adhering to each other when welding has been effected.

The main advantage of the pallet crate according to the invention lies in the fact that it can be manufactured with minimum control of the welding parameters for the metal tubes, enabling the manufacture to be carried out with a high degree of automation and at limited cost.

Further characteristics and advantages of the pallet crate according to the invention will become clearer from the detailed description of one preferred embodiment, given below by way of non-limitative example with reference to the appended drawings.

BRIEF DESCRIPTION OF THE DRAWINGS

FIG. 4 is a cross-section of the detail of FIG. 2 before welding.

FIG. 5 is a cross-section of the detail of FIG. 2 after welding.

FIG. 6 is a schematic view illustrating the welding of the detail of FIG. 2.

DESCRIPTION OF THE PREFERRED EMBODIMENT

Figure 1:
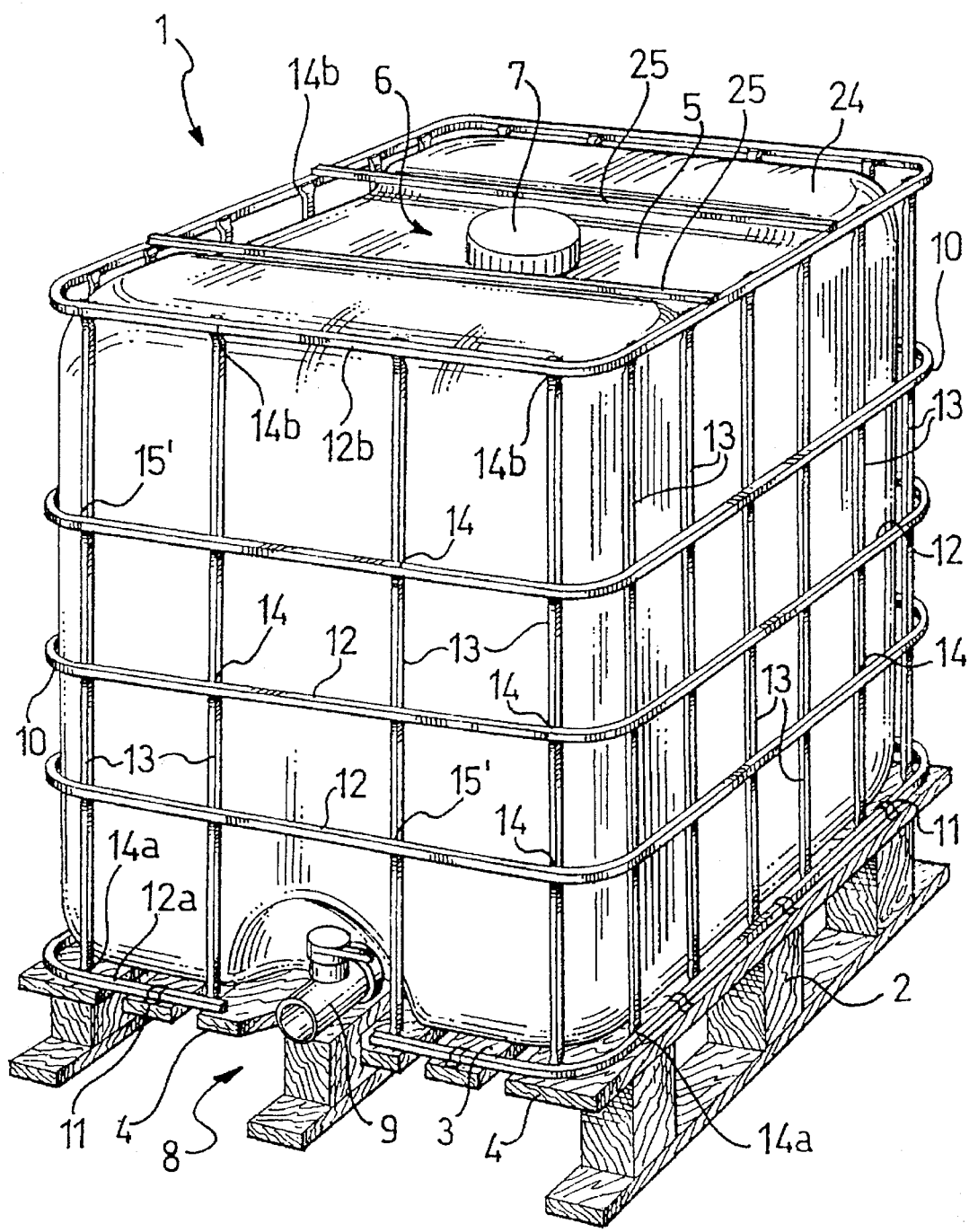
FIG. 1 is a perspective view of a palletised container incorporating the pallet crate of the invention.

In the drawings a palletised container is generally indicated 1. It includes a pallet 2 of the four-way type made from wood which defines a flat support surface 3 formed by a plurality of planks 4.

On the support surface 3, the palletised container 1 includes a plastics tank 5 of substantially cubic shape.

The tank 5 has a loading aperture 6 provided with a stopper 7 and a discharge aperture 8 provided with a tap 9.

The palletised container 1 further includes a pallet crate 10 according to the invention which is fixed to the support surface 3 of the pallet 2 by hooks 11 and has a vertical extent such as to surround the periphery of the tank 5.

The hooks 11 may be replaced by through-screws screwed into the support surface 4.

The pallet crate 10 comprises a plurality of horizontal and vertical metal tubes indicated 12 and 13 respectively arranged in a lattice structure and intended to be welded together at crossing points 14.

In the said lattice structure, the horizontal tubes 12, like the vertical tubes 13, are spaced precisely to support the thrust of the walls of the tank 5 to best effect when the tank 5 is full of liquid and bears against the crate 10.

The horizontal tubes 12, which form closed rings around the tank 5, the crate 1 include a base tube 12a which contacts the support surface 3 and an uppermost, or top, tube 12b above the tank 5.

In correspondence with the top and bottom tubes 12b, 12a, the crossing points, indicated 14b and 14a respectively, are T-shaped.

The top tube 12b delimits an upper aperture 24 through which the tank 5 may be introduced into the crate 10 or removed therefrom.

To lock the tank 5 within the crate 10 the pallet crate 10 has removable bars 25 engaged with the top element 12b and extending transverse the upper aperture 24.

Advantageously, the metal tubes 12, 13 of the crate 10 according to the invention are of quadrilateral section, for example rectangular or square, with side faces 15 and edges 17.

In the present embodiment, the tubes 12, 13 are square in section. They include respective flat surfaces 15' which face each other at the crossing points 14.

In the presently preferred embodiment of the invention, the flat surfaces 15' are defined by the side faces 15 which are also flat.

Figures 2, 3:
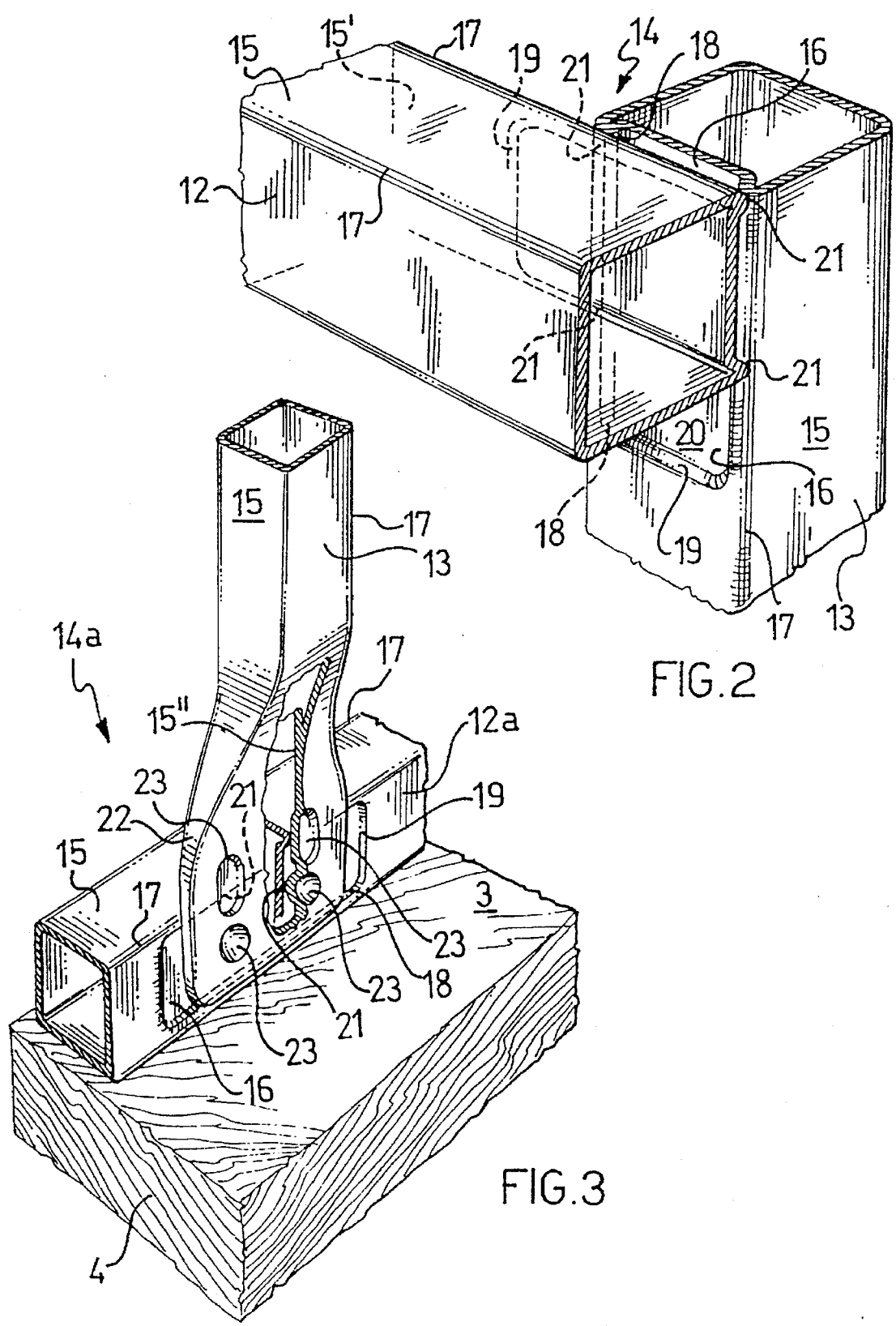
FIG. 2 is a perspective view of a detail of the pallet crate of FIG. 1.
FIG. 3 is a partially-sectioned perspective view of a further detail of the pallet crate of FIG. 1.

The pallet crate 10 according to the invention further includes elongate recesses 16 (FIG. 2) formed in the flat surfaces 15' so as to extend along the longitudinal axes of the respective tubes 12, 13 and transverse the recesses 16 of the tubes 12, 13 in mutually facing positions.

The elongate recesses 16, which are substantially rectangular, are bounded by shoulders 18 formed at the edges 17 and by vertical walls 19 extending between the edges 17 and perpendicular thereto.

Each elongate recess 16 has a constant depth relative to the flat face 15' and has an extensive flat base 20 bounded by the shoulders 18 and by the vertical walls 19.

Thus, at each crossing point 14 to be welded, the crate 10 has four essentially point contacts 21 defined by the superposition of the shoulders 18 of the corresponding recesses 16.

Moreover, in this same situation, the flat bases 20 of the mutually facing recesses 16 (FIG. 4) are parallel to each other and spaced by a distance equal to the sum of the depths of the recesses 16.

At the T-shaped crossing points 14a, 14b, the vertical tubes 13 have flattened end portions 22 (FIG. 3) which in turn define flat surfaces 15" facing the respective flat surfaces 15' of the base or top tube 12a, 12b with the elongate recesses 16.

Four projections 23 are formed on each flattened end portion 22 and project towards the recess 16 in the horizontal tube 12a, 12b.

The projections 23, with the corresponding shoulders 18 and the flat bottom 20 of the recess 16, result in contacts 21 similar to those described above.

The elongate recesses 16 may be formed simply by pinching in a clamp between a die in contact with the three side faces 15 and a die of rectangular shape which is pressed onto the remaining side face 15.

The shape of the latter die determines the shape of the flat base 20.

The welding at the crossing points 14 and at the T-shaped crossing points 14a, 14b is effected by the passage of a strong electric current through the contact points 21. This welding is so-called projection or resistance welding.

At the contact points 21, because of the small surface area in common, the crossing points 14 have a high electrical resistance as a result of which, on passage of the electric current, a large amount of heat is generated which is able to fuse the metal tubes 12, 13 at the shoulders 18 of the recesses 16.

The electric current (FIG. 6) is produced by a generator 30 connected to the metal tubes 12, 13 by an electrode 31 placed in correspondence with the crossing point 14.

The metal tubes 12, 13 are simultaneously subjected to considerable pressure at the crossing points 14 by means of a press 32.

In the pallet cage 10 according to the invention, the flat bases 20 of the elongate recesses 16 in mutually facing positions at the crossing points 14 adhere to one another when welding has been effected.

In fact, as a result of the fusion of the shoulders 18 and the pressure exerted on the tubes 12, 13, the bases 20 are brought closer together until they adhere while the current is passing.

When the bases 20 adhere, the overall electrical resistance offered by the crossing points 14 reduces drastically since the surface area in common increases suddenly.

When the bases 20 adhere to each other and the resultant electrical resistance is reduced, if the current strength is maintained, the degree of heat needed to melt the metal of the tubes 12, 13 is no longer generated.

Thus, welding is stopped automatically, without any control or intervention.

A projection welding system for the manufacture of pallet cages according to the invention is thus considerably simplified.

Indeed, it is not necessary to check the values of the current strength, the force exerted by the press and the time for which the current passes; it suffices to set a current strength and a force which will be adequate for a predetermined time within which welding will certainly occur.

For example, for structural steel tubes having a thickness of from 0.7 mm to 1.2 mm it suffices to set the system for a current of 15,000 Å and a force of 4,000N exerted by the press 32 for a period of 200 ms. The result is a voltage of about 7 V.

Welding at the T-shaped crossing points 14a, 14b occurs in a manner similar to that described above.

The contacts 21 resulting from the projections 23 are equivalent to the crossing points 14, and the flat face 15" of the flattened portion 22 of the vertical tube contacts the flat base 20 when welding has occurred.

In addition to the advantage mentioned above, the pallet crate according to the invention achieves a considerable structural simplification in that the base and top tubes are entirely identical to the other tubes, both horizontal and vertical.

At the T-shaped crossing points and, specifically, the flattened portions of the vertical tube, the cut ends of the tube do not require special rounding treatments to remove sharp edges since none of these sharp edges project in a dangerous manner from any point on the pallet crate.

These ends may thus be welded automatically like the other crossing points of the crate.

The elongate recesses may also be formed easily by automated pinching.

The structural details above of the pallet crate of the invention described make it easy and cheap to manufacture automatically.

One skilled in the art may make numerous variations to the pallet crate described above to satisfy particular, contingent requirements, all of which fall within the scope of protection of the invention as defined by the following claims.

I claim:

1. A pallet crate comprising metal tubes, arranged in a lattice structure and welded at crossing points, the metal tubes including respective flat faces facing each other at the crossing points, recesses formed in said flat faces each extending along the longitudinal axis of the respective metal tube and transverse the respective recess of the facing metal tube, the recesses including an extensive portion with a flat base and bounded by shoulders extending above said flat base and extending parallel to said tubes, the flat bases of the recesses in mutually facing positions adhering to each other when welding has been effected, forming said pallet crate.

2. The pallet crate of claim 1, wherein said metal tubes have flat side faces and edges, said flat surfaces being defined by the side faces.

3. The pallet crate of claim 2, wherein said metal tubes have quadrilateral-shaped sections.

4. The pallet crate of claim 2, wherein the recesses are substantially rectangular in shape and are bounded by shoulders formed at the said edges and by vertical walls extending between the edges and perpendicular thereto.

5. The pallet crate of claim 4, including four substantially point contacts at each crossing point to be welded, said point contacts being defined by the superposition of the shoulders of the recesses in mutually facing positions.

6. The pallet crate of claim 1, wherein the flat bases of the recesses in mutually facing positions at each crossing point to be welded are parallel to each other.

7. The pallet crate of claim 6, wherein said metal tubes have flat side faces and edges, said flat surfaces being defined by the side faces, said recesses being substantially rectangular in shape and being bounded by shoulders formed at the said edges and by vertical walls extending between the edges and perpendicular thereto.

8. The pallet crate of claim 7, wherein said metal tubes have quadrilateral-shaped sections.

9. The pallet crate of claim 7, wherein said metal tubes have rectangular sections.

10. The pallet crate of claim 7, wherein said metal tubes have square sections.

11. The pallet crate of claim 7, including four substantially point contacts at each crossing point to be welded, said point contacts being defined by the superposition of the shoulders of the recesses in mutually facing positions.

* * * * *

UNITED STATES PATENT AND TRADEMARK OFFICE
CERTIFICATE OF CORRECTION

PATENT NO. : 5,645,185
DATED : July 8, 1997
INVENTOR(S) : Virginio Cassina

It is certified that error appears in the above-identified patent and that said Letters Patent is hereby corrected as shown below:

On the title page, item [73] Assignee: change "Futisplast S.p.A.", to --Fustiplast S.p.A.--.

Signed and Sealed this

Eleventh Day of November, 1997

Attest:

BRUCE LEHMAN

Attesting Officer

Commissioner of Patents and Trademarks